United States Patent [19]
Fitch, Jr.

[11] Patent Number: 5,458,055
[45] Date of Patent: Oct. 17, 1995

[54] METHOD AND APPARATUS FOR PORTIONING FOOD

[76] Inventor: Clifford E. Fitch, Jr., R.R. #2, Box 74C, Beecher, Ill. 60401

[21] Appl. No.: 154,913

[22] Filed: Nov. 18, 1993

[51] Int. Cl.⁶ .................................... A21C 9/04
[52] U.S. Cl. .................. 99/450.1; 99/450.6; 99/494; 83/703
[58] Field of Search ............... 99/450.1, 450.6, 99/450.7, 423, 443 R, 443 C, 494; 83/703, 409.2, 411.2, 488

[56] References Cited

U.S. PATENT DOCUMENTS

| | | | |
|---|---|---|---|
| 2,715,878 | 8/1955 | Egerton | 99/450.7 |
| 3,633,450 | 1/1972 | Grote | 83/201 |
| 3,760,715 | 9/1973 | Grote et al. | 99/450 |
| 3,912,433 | 10/1975 | Ma | 99/450.6 |
| 4,060,027 | 11/1977 | Jenny | 99/450.1 |
| 4,068,570 | 1/1978 | Lanoie | 99/443 R |
| 4,112,834 | 9/1978 | Thiry | 99/450.1 |
| 4,152,976 | 5/1979 | Kawasaki et al. | 99/450.1 |
| 4,202,260 | 5/1980 | Weger | 99/450.1 |
| 4,230,007 | 10/1980 | Grote et al. | 83/409 |
| 4,438,686 | 3/1984 | Perez | 99/443 C |
| 4,771,726 | 9/1988 | Fitch, Jr. | 118/25 |
| 4,960,025 | 10/1990 | Fitch, Jr. | 83/703 |
| 5,012,726 | 5/1991 | Fehr et al. | 99/450.7 |
| 5,121,677 | 6/1992 | LeClaire et al. | 99/450.1 |
| 5,171,367 | 12/1992 | Fitch, Jr. | 118/25 |

*Primary Examiner*—David A. Scherbel
*Assistant Examiner*—James F. Hook
*Attorney, Agent, or Firm*—Wallenstein & Wagner, Ltd.

[57] ABSTRACT

A high speed, automatic apparatus for accurately and consistently portioning solid or liquid food material, such as sausages or sauces, onto receivers, or substrates, such as pizza crusts, is disclosed. A conveyor moves the substrates, in a first path while a hopper moves in a second, preferably circular path, that partially overlies the first path. The hopper further includes a plurality of hoppers in a carousel where the hoppers hold the material to be portioned. A blade underneath the hopper removes portions of the food material as the hopper moves in its circular path. Controls are provided to synchronize the movement of the hopper relative to the conveyor where the conveyor and hopper are continuously moving together. As the portions of the food material are cut by the blade, the portions are propelled and directed onto the substrates.

36 Claims, 9 Drawing Sheets

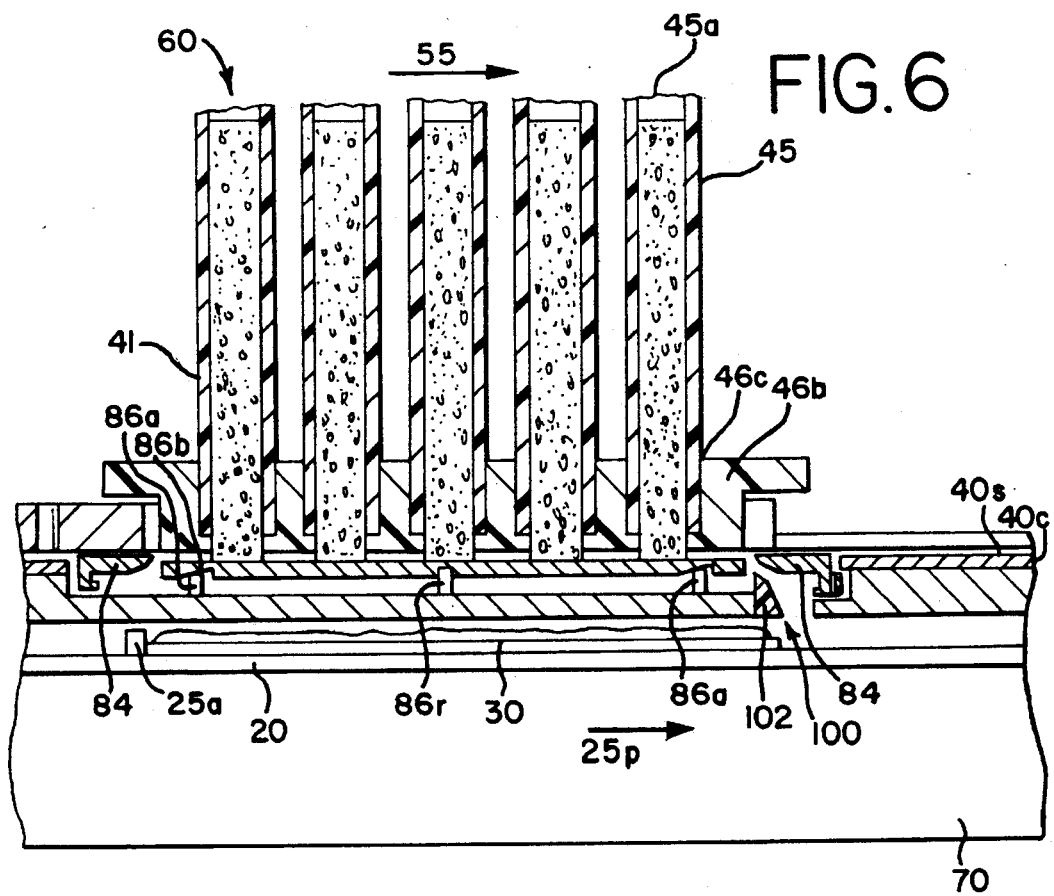
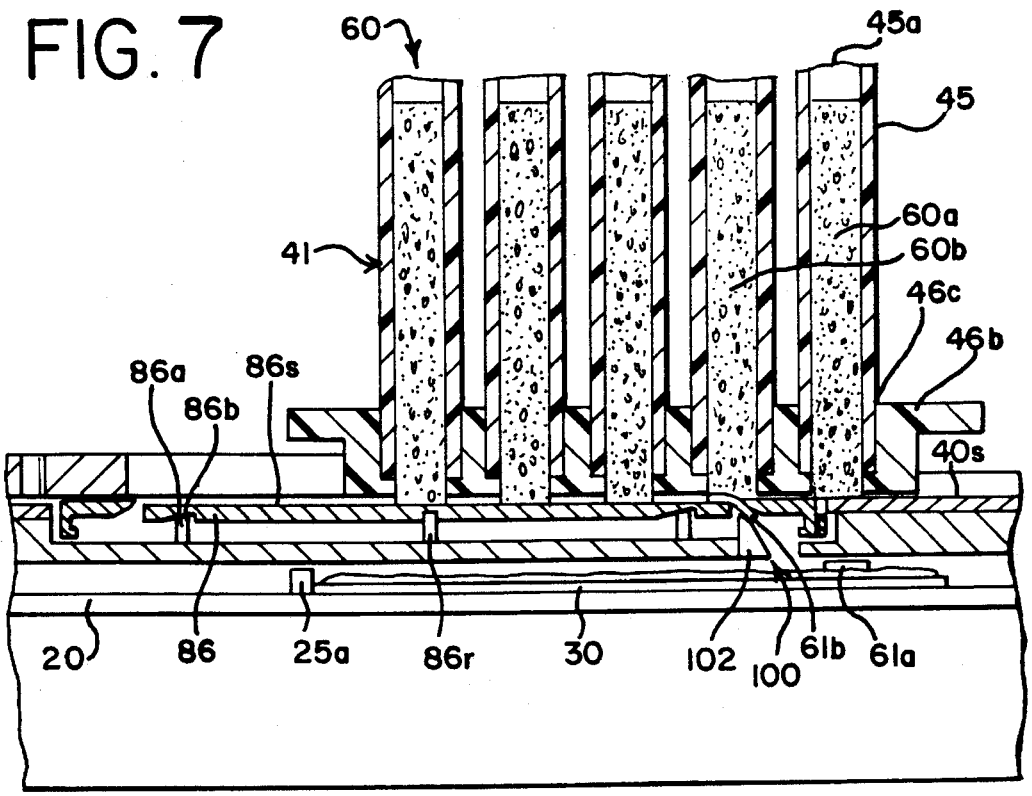

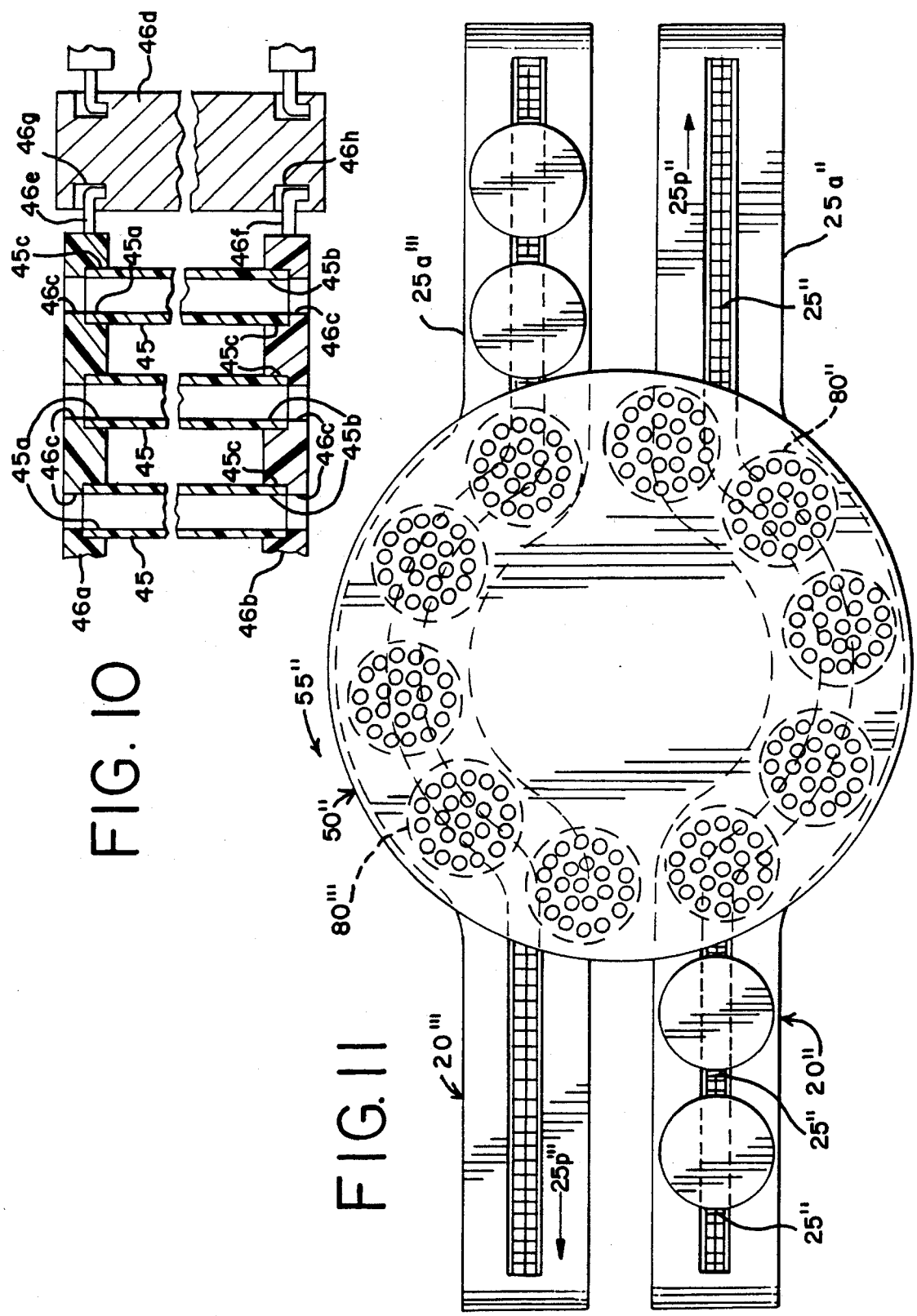

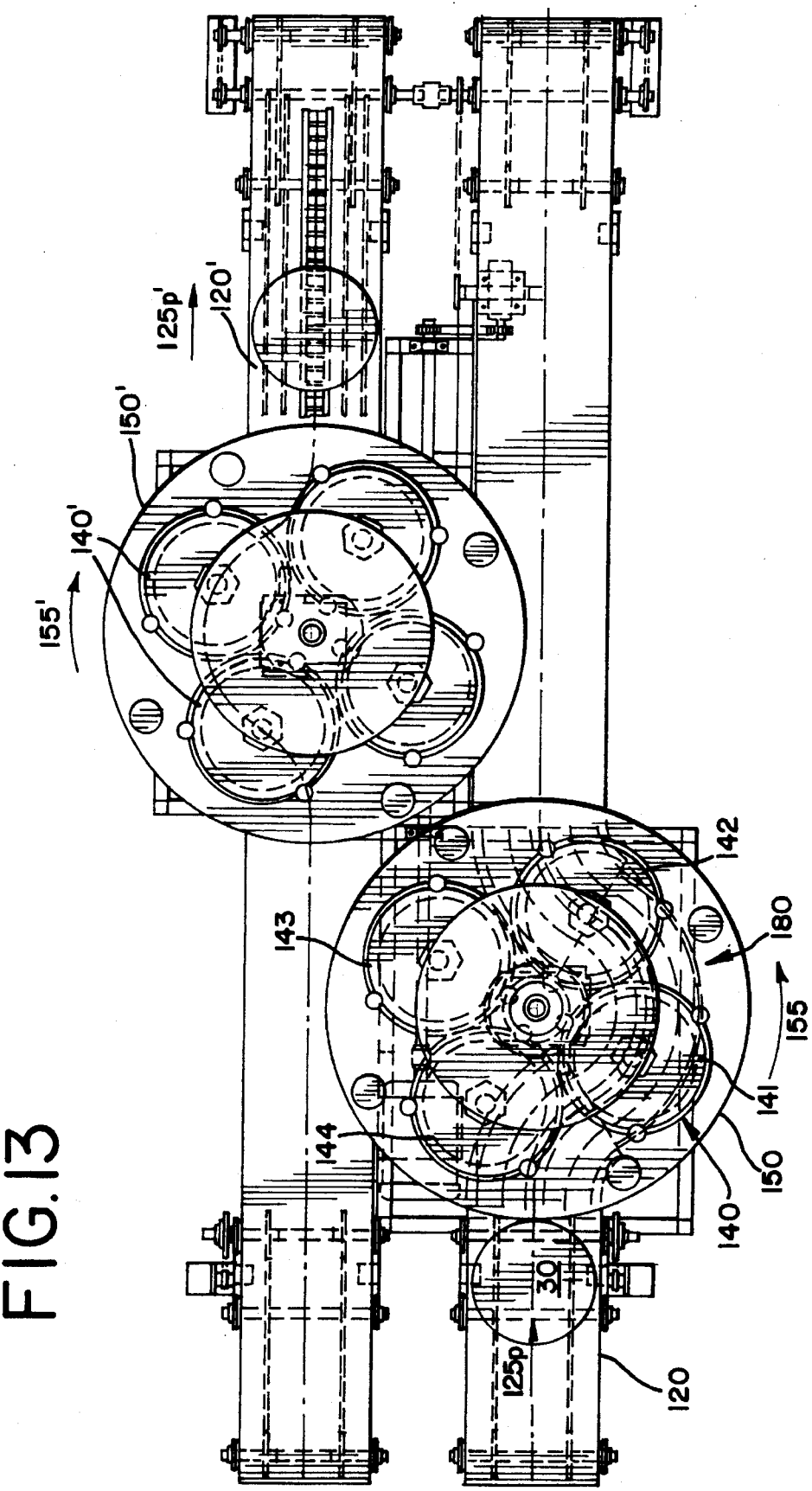

METHOD AND APPARATUS FOR PORTIONING FOOD

TECHNICAL FIELD OF THE INVENTION

This invention relates generally to an apparatus and method for the automatic, high speed, accurate, efficient and continuous preparation and processing of food products such as pizzas and sandwiches and more particularly concerns improved portioning equipment and processes for creating predetermined portions of food such as, for example, slices of meat or quantities of sauce and applying them in a continuous uninterrupted manner in a predetermined or dedicated pattern to a substrate such as a pizza crust or slice of bread.

BACKGROUND OF THE INVENTION

With the increased acceptance of mass-produced food products such as pizzas which are commonly sold in high volume by grocery stores, these food products have come of interest to large scale production. As volumes increase, the pressure for reduced prices has created a challenge for suppliers to manufacture them at a lower cost while maintaining the highest quality and consistency. Thus, pizza making devices such as shown in my U.S. Pat. No. 4,960,025, titled, "Apparatus for Slicing Meat Sticks," designed to be reciprocally operated in the order of a maximum of forty (40) pizzas per minute, tend to be too slow and too labor intensive for these applications. As is shown in that patent, a hopper filled with sticks of meat products is fixed in position over a pizza crust which typically is manually positioned by an operator. After situating the pizza crust, the operator activates a rotating slicing ring to move it into place under the hopper surrounding the ends of the sticks of meat and then retracts the slicing ring back to its starting position by which action the rotating ring operates to cut a slice of a preset thickness from each of the sticks of meat, which slices are allowed to drop in place on the pizza crust. While this was considered advanced technology at the time of the invention, it has since been found that for today's very high volume operation, it is too slow, too labor intensive, too space intensive and too inefficient.

SUMMARY OF THE INVENTION

The shortcomings of the prior art are overcome by the invention of a greatly improved, high speed, synchronized, continuously operating apparatus and method for portioning pieces of food products and dropping them in a pre-determined pattern onto a substrate such as a pizza crust at a rate in the order of 90 per minute or better.

As with my prior invention set forth in U.S. Pat. No. 4,960,025, and incorporated herein by reference, a hopper comprising a plurality of generally vertically disposed cylindrical tubes adapted to receive a stick of pepperoni therein, is positioned over a cutting means comprising a rotating ring having an inner cutting edge that is set a pre-determined distance above a support means such as a platter-like structure which platter is to be contacted by the ends of the sticks of pepperoni to be sliced. Accordingly, when the ends of the pepperoni sticks are supported by the platter, a relative parallel movement between the sticks and the cutting means produces slices generally of the pre-determined thickness that can drop onto a substrate such as a pizza crust.

While the general concept of slicing using a rotating ring has been incorporated into the improved apparatus and method of my instant invention, the similarity ends there. Thus, whereas in the U.S. Pat. No. 4,960,025, the cutting ring is reciprocated and the receiver substrate and hopper are stationary, in the instant invention the cutting means remains fixed in position over a continuously moving conveyor means on which pass exactly spaced food material receiver substrate means such as pizza crusts in a first path synchronized to the continuous movement of a hopper means on a second path. The movement of the substrate receiver means and hopper is precisely timed so that the receiver means are in an exact position below the cutting means when a hopper means filled with materials from which portions are to be separated is moved by a drive means on a second path to pass thereover so that as the hopper is moving, the lower portion of the materials therein engage the cutting means to separate a slice which drops onto and is effectively caught on-the-fly by the moving pizza crust substrate. Further differences with my prior patent include but are not limited to the facts that the thickness of the portion may be adjusted during continuous operations without slowing the operation; improved construction and operation of the blade result in smooth, more accurate operation and longer life; a new portion propelling and guide means directs separated portions to the substrate directly and accurately; a substrate infeed spaces substrates in predetermined flights; a "no substrate" system detects missing substrates and reacts during continuous operations to prevent portions being separated in such event; and assembly, disassembly and cleanability features are included. The automatic, precise, repeatable relative movement produces consistent high quality products at a very high rate of speed with minimum capital investment and maintenance costs in a very small floor space.

It is an object of the instant invention to provide an improved apparatus and method for the automatic, continuous high speed sequential slicing of a plurality of pieces of a predetermined size and thickness from a supply of food material in a hopper and applying those slices of material in a predetermined arrangement on the surface of a receiver.

Another object is to move the receiver on a conveyor means in a substantially continuous first path and in timed relationship with the movement of a hopper means full of a plurality of pieces of food material to be sliced moving in a second path so that the first and second paths meet at a portioning means such as a slicer whereby the portions or slices of food material are deposited on the receiver as it moves under the hopper means.

A further object of the invention is to provide a plurality of hopper means in a carousel structure whereby each hopper means carries a plurality of pieces of the material to be sliced. The carousel typically moves in a second path such as a circle with each hopper moving in timed relationship to a specific predetermined receiver substrate.

A further object is to provide a similar arrangement of conveyors, carousels, drive and control means to apply liquid or semi-liquid material such as a sauce material to a substrate such as a pizza crust in a small, continuous, high speed, high quality operation. Such apparatus may be arranged first in series with the solid food dispensing apparatus for step-by-step production of food products such as pizza.

Other objects include, but are not limited to, (a) increased accuracy and speed of operation by providing a means to propel and accurately direct the slices as they are cut onto the substrate quickly and in a predetermined direction; (b) being able to vary slice thickness easily and quickly during continuous operation; (c) automatically achieving effective zero thickness when no substrate is present on the conveyor; (d) being able to quickly disassemble important portions of the unit for ease of cleaning, and maintenance; and (e) being able to quickly, accurately and safely sharpen and hone the cutting blade.

Other advantages and aspects of the invention will become apparent upon making reference to the following specification, claims and drawings.

DESCRIPTION OF THE DRAWINGS

FIG. 5A is an enlarged view of the area in

FIG. 6 showing the thickness determining means;

FIG. 6 is an enlarged schematic view of a hopper in place within a circular cutting knife means prior to cutting action occurring;

FIG. 7 is a view similar to FIG. 6 showing the cutting action which occurs during relative movement of the hopper and the cutting means to deposit portions of the material in the hopper on the substrate receiver means;

FIG. 10 is a schematic cross-sectional view of the hopper means showing the support for the holder means and its attachment to a central support;

FIG. 11 is a schematic representation of an alternative embodiment wherein a single carousel passes over a plurality of portioning means above a plurality of substrate bearing conveyors;

DETAILED DESCRIPTION OF THE INVENTION

Figure 1:
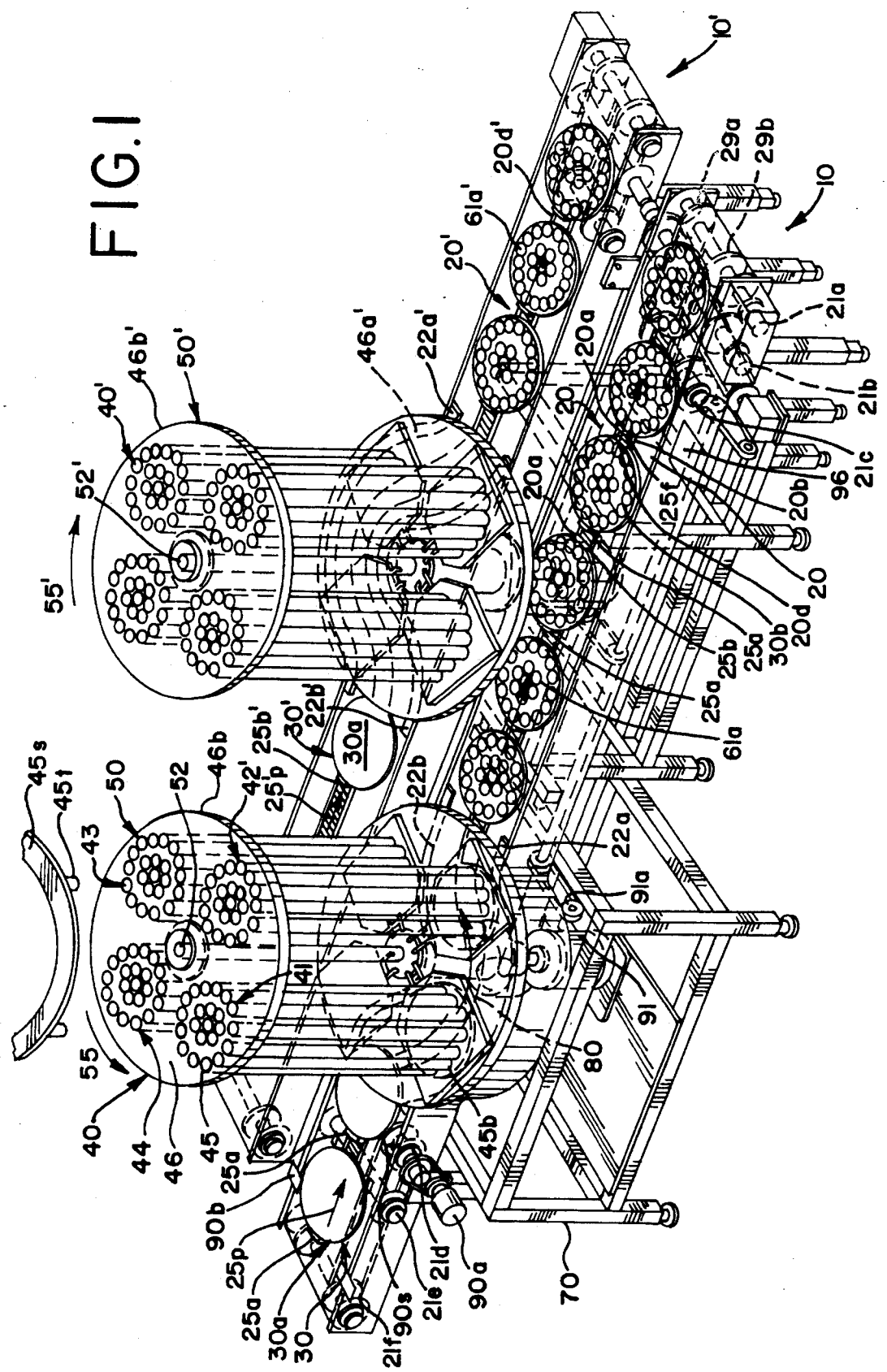
FIG. 1 is a schematic perspective view of an embodiment of the apparatus according to the invention herein wherein a plurality of apparati are arranged in side-by-side relationship with a common drive and control means.

While this invention is susceptible of embodiment in many different forms, there is shown in the drawings and will herein be described in detail a preferred embodiment of the invention with the understanding that the present disclosure is to be considered as an exemplification of the principles of the invention and not intended to limit the broad aspect of the invention to the embodiments illustrated.

According to the embodiment of the invention as shown in FIGS. 1–13, there may be seen a high speed automatic food material processing and applying apparatus generally indicated at 10 comprising a conveyor or carrier means generally indicated at 20 for transporting a plurality of food receiver substrate means (such as pizza crusts) generally indicated at 30 in precisely spaced flights 25b on a first path generally indicated at 25p passing underneath a hopper means generally indicated at 40.

Figure 3:
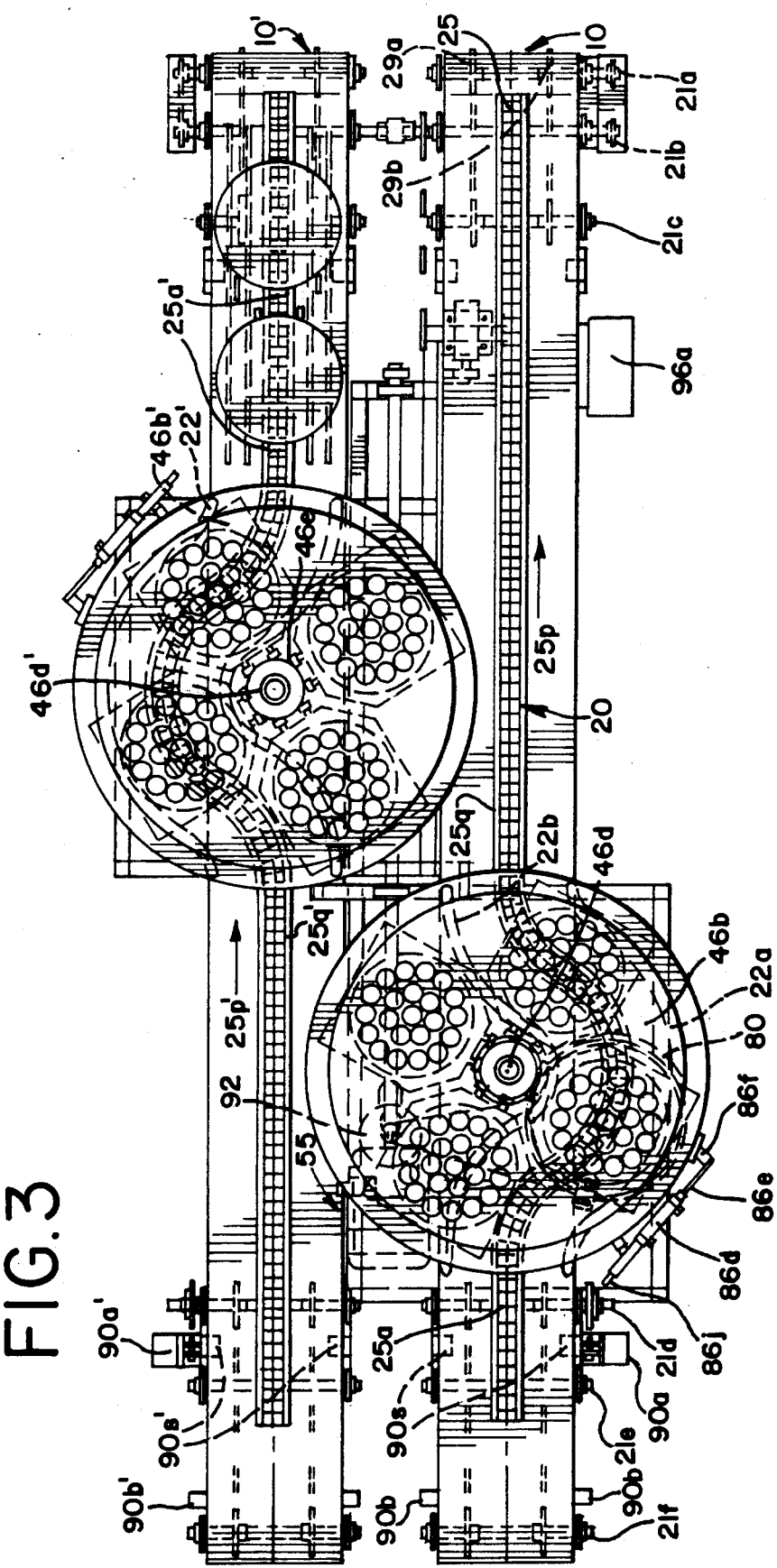
FIG. 3 is a plan view of the apparatus of FIG. 1 showing a cutaway portion in one side to illustrate the relationship of the portioning means to the conveyor means, hopper means and carousel means.

A plurality of individual hopper means such as generally indicated at 41, 42, 43 and 44 may be included in a carousel structure generally indicated at 50 which carousel rotates in a second path 55 about an axis 52 at a speed synchronized to the speed and/or spacing of the carrier means 20 whereby food materials generally indicated at 60 contained within the hopper means 40 pass over a stationary portioning or cutting means 80 shown by the dotted lines in FIGS. 1 and 3 in timed synchronized movement with the carrier means 30 so that as shown in FIGS. 6 and 7, a portion generally indicated at 61a and 61b of each of the pieces of the materials 60a, 60b in the hopper are removed and accurately deposited on the receiver 30 at a high rate of speed. The path 55 of the individual hopper means 41–44 is set to pass over the portioning means 80 and to coincide in part with the path 25p of the receiver means 30. A frame means 70 is provided for solid support for the various elements and to allow easy set-up and movement.

A pair of machines generally indicated at 10 and 10' may be placed in side-by-side relationship as shown, for example, in FIG. 1 to increase the efficiency and the use of floor space and to allow conveying and hopper operation by a single motive drive means schematically indicated at 90. Because the carousel 50 must be of a diameter about twice the width of the conveying means 20, it has been found that staggering the positioning of the carousels 50, 50' along the length of the conveying means 20 and 20' allows the machines 10 and 10' to be moved closer to each other for a smaller footprint and increased operating efficiency.

Other than the different location of the carousels along their length, the elements of the machines 10 and 10' may be substantially identical. Although it is typical that they will be operated together, they may be operated separately and at different speeds. It is contemplated that in any event they will have a common drive means generally indicated at 90. For purposes of brevity of description, the apparatus or machine generally indicated at 10 will be described in detail and since the relationship and method of operation of the operating parts in the machine generally indicated at 10' are the same, the description will not be repeated. Thus, it will be appreciated by those skilled in the art that the description of the adjacent apparatus 10' will be the same and may be understood by referring to the numbered equivalent portions of the apparatus 10 not containing a prime suffix. The apparati 10 and 10' may be used to make the same or different products. Thus, the apparatus 10 may make a pizza of ten inch size with one predetermined ingredient whereas the apparatus 10' may be used to make a different sized, e.g., twelve inch pizza with the same or different ingredients. Similarly, a plurality of machines may be arranged in series to each apply different ingredients to a single substrate moving seriatim therethrough.

Also, as illustrated in FIG. 11, it is within the contemplation of this invention that a plurality of conveyor means 20", 20" may pass in paths 25p" and 25p''' under a single carousel means 50". In such case a first conveyor means 20", may be spaced on one side of the centerline of the carousel 50" and the second conveyor means 20''' on the opposite side of the centerline. Each will have a curvalinear portion where they pass under and in general coincidence with a curvalinear path 55" of the carousel 50" and under respective portioning means 80" and 80"'. To accomplish the portioning while the substrate means and supply means are moving in the same direction relative to the portioning means, it is necessary that the first and second conveyor means move in opposite directions. Common functioning elements are shown by double and triple primed numbers. Clearly other variations are possible embodying the advantageous principles of the invention.

Figure 2:
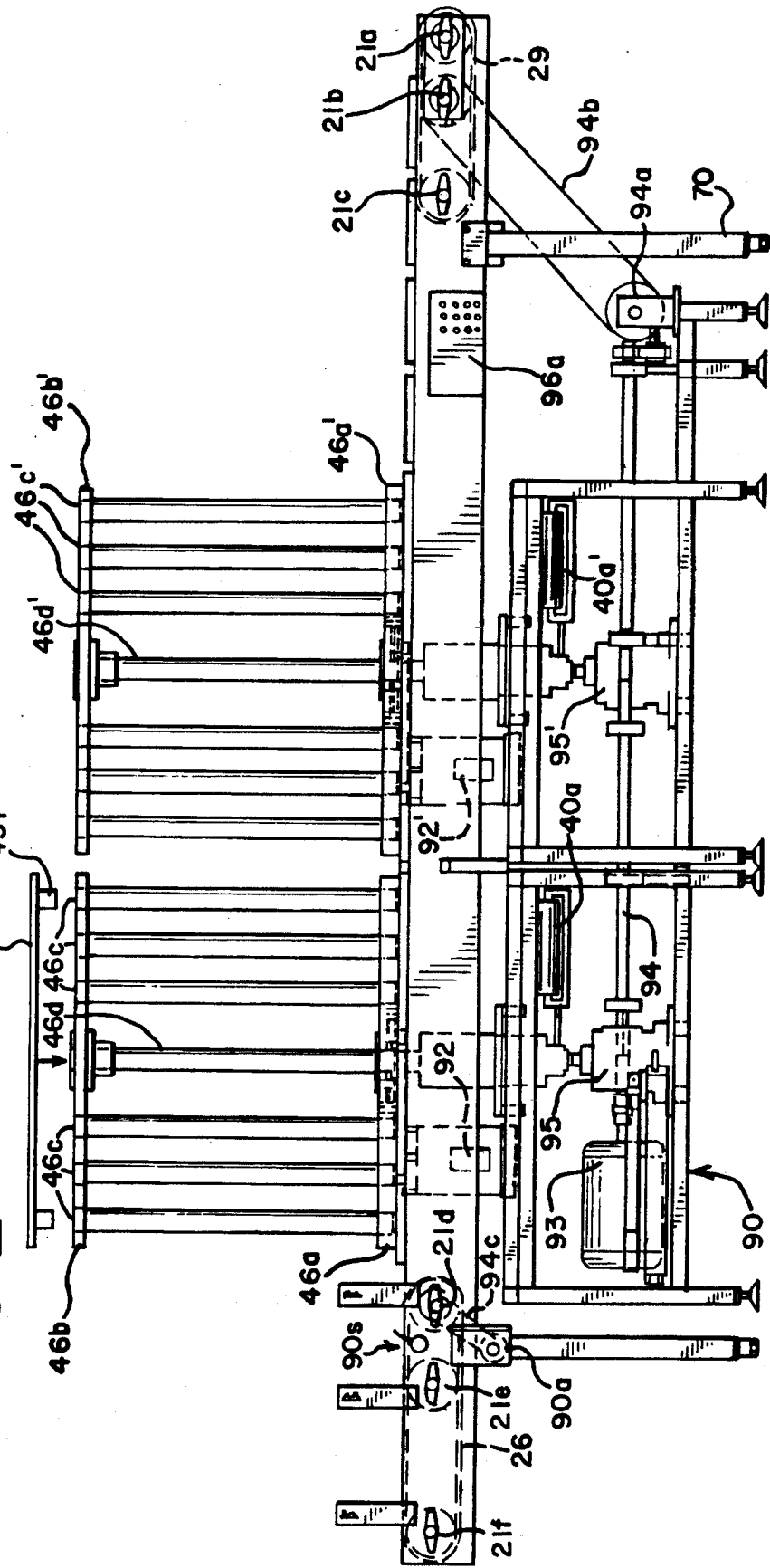
FIG. 2 is a schematic elevational side view specifically showing the drive means for the units.

Referring to FIGS. 2 and 3, it may be understood that the conveying means generally indicated at 20 includes a side flex linked belt structure 25 driven by suitable means over rollers generally indicated at 21b and 21e and guided as required to move smoothly, quickly and quietly. As shown, the path 25p is straight except in the area of the carousel 40 at which point, as shown in FIG. 3, it takes a generally circular path to coincide in part with the path 55 of the hopper means 41–44. As shown in FIG. 2, the conveyor belt 25 may be driven by suitable motor means 93 through a suitable power transmission means generally indicated at 94 and gear drive means generally indicated at 95.

The conveyor means 25 is an endless flex belt means structure passing over pulleys 21b and 21e at opposite ends of the conveyor path 25. The side flex linked belt construction allows the belt to follow straight and curved paths, the latter of both a lateral and vertical nature. As shown, pulley 21b is driven off of the drive means 90 through various means 94 including input-output gearing means 94a and belt 94b. The pulleys 21b and 21e each have tooth-like gripping surfaces that engage a mating surface on the belt means to provide a positive no-slip engagement with the belt means. Throughout its length, the belt means passes between parallel guide means 25g so that is path is accurate and remains the same. The guide means 25g are a low friction material such as food grade UHMW polymer. The belt means and guides 25g may be easily disassembled and removed for cleaning or maintenance. In practice, we have found flex belts made by Rexnord of Milwaukee, Wis. to meet our requirements.

The belts 25 may be divided into what are referred to as "flights" by means of protrusions 25a upstanding from the conveyor belt 25 and spaced in specific relationship therealong to define the "flights" 25b. The protrusions 25a are adapted to engage the rear of the items to be conveyed such as the pizza substrates and push them along in a specifically spaced relation. The spacing or flight 25b of the flight protrusions 25a may be determined by a number of factors including the expected size range of the items to be conveyed and the spacing and speed of the hopper means 41, 42, 43 and 44, especially in the area of overlap and/or coincidence of the paths. In the embodiment disclosed, the flight defining protrusions 25a are spaced at a distance equal to the spacing of the hopper means 41, 42, 43 and 44 since both, in this case, move at the same speed. Accordingly as shown in FIGS. 6 and 7, portions 61a received from the material 60 in hopper means 40 will be deposited on the substrates means 30 in each flight 25b moving along substantially contemporaneously therewith.

The protrusions 25a are of a size and configuration such that they will hold the substrate securely and move it quickly and accurately along a generally straight path. Where the path curves, however, as, for example, where it passes under the carousel hopper means 50, and especially where the substrate moves at high speed through the curves, it is important that a side guide be provided. For this purpose, we include side guide means 22 that are durable, easily cleaned, and quickly changed from one size to another. As shown in dotted lines in FIGS. 1 and 3, the side guide means 22 includes a first portion 22a suitably snap-fitted into position on the outside of the curved path 25p and a second portion 22b suitably snap-fitted on the inside of the curve. Each has an inside edge parallel to and equally spaced from the centerline of the conveyor path 25p. Preferably these guide units are of a thickness in the vertical direction equal to or slightly less in thickness than the substrate whose edges are adapted to bear thereagainst. With a single set of snap-fit means into which the guides are securely mounted against lateral movement, the different width substrates may be easily accommodated by varying the width of the guides. As the width or diameter of the substrate changes, the width of the guide means may be changed so that the spacing between them will be approximately equal to or slightly greater than the expected effective width of the substrate being guided. At the incoming end of the guides a tapered entrance guides in any substrates that may be off center. Made of a heavy-duty food-grade UHMW polymer plastic, the guides are durable and may be readily removed for cleaning or to change sizes. With substrates of different widths or diameters, the distance between the guides may be varied by replacing them with guides of different widths. For example, a 2½" wide guide may be used for 12" pizzas and a 3½" wide guide may be used for 10" pizzas. In practice, the snap fittings may be projections depending downwardly and spaced to fit in mating receivers on the machine frame structure.

Changing the guide means 22 is further facilitated by a carousel vertical lift adjustment means schematically shown at 40a, for quickly raising the entire carousel means 40 an infinitely variable amount up to a foot or more. Thus, there may be provided a clearance sufficient to allow ready access to and removal of the guide means 22 as well as to access the portioning means or to simply raise the hopper to accommodate thicker substrates such as sandwiches. In practice, we have found a hand operated hydraulic means located adjacent each carousel on the frame as shown schematically in FIG. 2 near an operator access point, provides good results as a lifting means 40a. Operation of the pump causes fluid to be moved to a piston-plunger arrangement at the base of the central support member 46d.

Placement of the incoming substrates means such as pizza shells within the defined flights 25b of the conveying means 20 is effected by an infeed means comprising a pair of infeed belt means 26a, 26b with one located on each opposite side of the input end of conveyor means 27. In the preferred embodiment, the infeed belt means 26a, 26b comprise members having a substrate contacting outer surface of a rubber-like material generally circular in cross-section that extends between and around pulleys 21d and 21f and are adapted to frictionally engage the bottom of the substrate means 30. Pulleys 21d and 21f are driven by a stepping motor or other DC motor 90a through a suitable power transmission means such as the best 90c. The motor 90a responds to a logic control means which includes a means 90b such as a photocell or magnetic means in belt 25 that detects the presence of a substrate means at a specific point as it enters the infeed means 26.

At the moment of detection, the logic control compares the position of the substrate to the position of the flight defining abutment 26a and, by means of the stepping motor 90a, changes the speed of the belt means 26a, 26b so that the belt means functions to place the substrate pizza shell 30 wholly within a specific flight 25b on the conveyor and to avoid having the shell override a flight. This is accomplished by the belt in the following manner. If it is determined by the logic control 90b from the positioning of the substrate means that it can be sped up to make or be placed within the flight, the logic control will increase the speed of the infeed belts 26a, 26b so that this occurs. If the incoming substrate means is in a position whereby the logic control 90b determines it could not be accelerated quickly enough to be placed within the flight, the belt will stop or slow the substrate means 30 and hold it for the next flight 25b. If the substrate means is too close to a prior substrate and the flight has been filled, the belt will stop or slow the substrate means and hold it for the next flight. If the substrate is moving at a speed and spacing that will place it within the flight, the belt will not change speed but move at the same speed. By this means, the logic control 90b effectively controls how fast the belt means 26a, 26b must go to place the substrate into the flight. Thus, it is possible to take incoming substrates at a very wide range of spacing or location and move them smoothly and accurately into the nearest flight to assure maximum throughput efficiency.

Once within the flight, the substrates are frictionally held by snubbers schematically indicated at 90s. The snubbers are high friction resilient members such as a rubber tube that has its upper end extending into the path of the lower surface of the substrates whereby it engages the bottom of the substrate and holds it with sufficient frictional force to cause it to slide over the belt 25 until it is engaged by a protrusion 25a which overcomes the resistance and moves it positively along. By this means exact spacing of the substrates against the flight 25a is assured. In this position, the substrates are moved in timed relationship to the hopper means 41, 42, 43 and 44 whereby they pass the portioning means at the same time to deposit the portions 61a received from the food supply means 60 in a predetermined arrangement.

At the exit end of conveyor 25, a take-off belt structure 29 similar in appearance to the infeed belt, comprises a pair of endless belts 29a, 29b looped over pulleys 21a, 21c and driven by a pulley belt arrangement connected to the conveyor drive pulley 21b as may be best seen in FIG. 3. These take-off belts remove the substrates 30 from the flights 26b so that the conveyor belt means 25 may return below the substrate transfer level back to pick up another substrate 30.

Each of the specific hopper means 41, 42, 43 and 44 may each comprise a plurality of food holder means such as parallel disposed cylindrical tubular means 45 suitably releasably held in a fixed position by a support means 46 including a bottom support 46a and a top support 46b most clearly seen in FIGS. 1, 3, 4 and 10. The holders 45 are suitably shaped for the material they are adapted to carry. Thus, for pepperoni they may be cylindrical tubes having an open upper end 45a and a open lower end 45b. This construction is particularly adaptable to sticks of food products indicated by the reference 61 to include pepperoni by way of example, which may be dropped into the open upper end 45a and moved by gravity or other suitable means downwardly so the lower end thereof projects through the open bottom end 45b and rests on the upper surface 86s of a support platter 86. Holders 45 may be arranged in any predetermined pattern as will be seen generally herein. This predetermined pattern or arrangement will typically determine the pattern of the slices removed therefrom and deposited on the pizza crust.

It is a feature of the invention that the outer hopper configuration may remain the same regardless of the size and shape of the pattern or area of the substrate on which it is desired to apply food portions. The hopper holders 45 in the predetermined area of the substrate 30 where food is not to be deposited may be quickly and easily closed off so that food means 61 will not be supplied thereto as shown in FIGS. 1 and 2. Means for blocking the upper openings 45a of the holder tube means 45 include a blocking structure 45s in the pattern of the hopper tubes 45 to be blocked having placement plugs 45t attached thereto. Accordingly, the blocking structure for the specific product to be produced may be easily dropped in place whereby it will be impossible to fill the holes with food material to be portioned. As products are changed, the blocking structure 45s may be changed to provide a chosen predetermined pattern for that product.

Figure 5A:
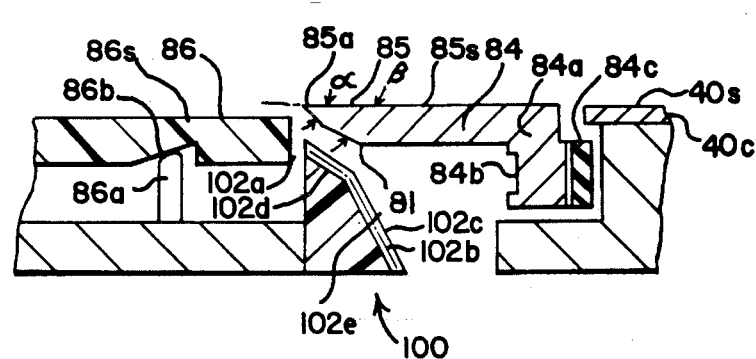
Figure 5B:
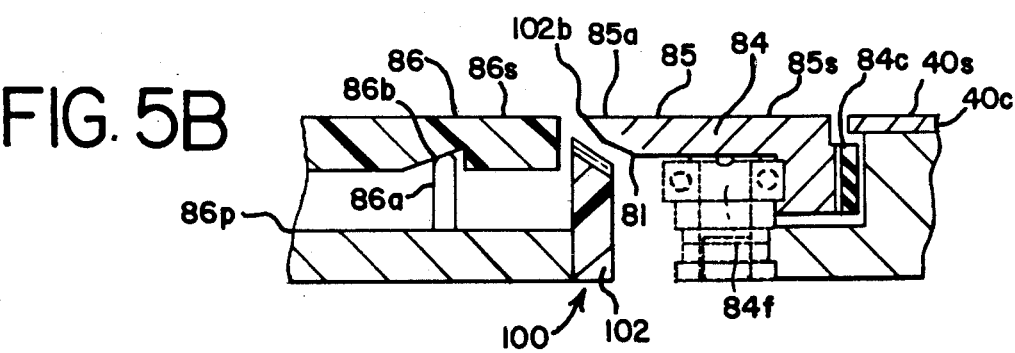
FIGS. 5B is an enlarged cross-sectioned view taken along lines 5B—5B of FIG. 8 showing the blade means and one bushing therefor.
Figure 8:
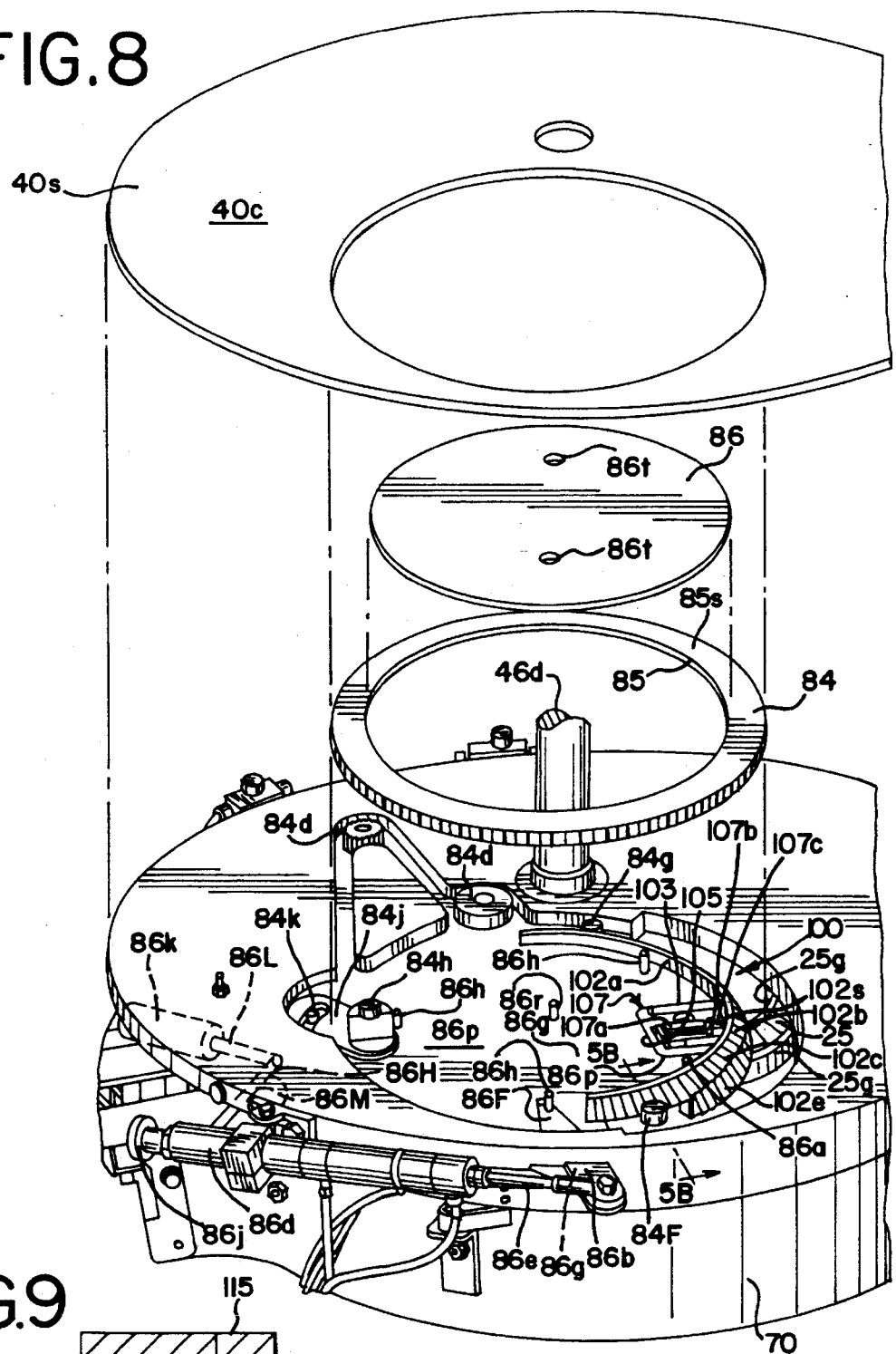
FIG. 8 is a perspective exploded view of the portioning means showing the means to propel and accurately direct the cut slices, the support platter height adjustment and the positive drive arrangement.

As may be seen in the exploded view of FIG. 8, a cover plate 40c is provided in the footprint of the carousel 40 except for the area of the portioning means 80 and the center support means 46d. This thin planar metal stainless steel member provides an easily removable and cleanable upper surface 40s against which the ends of the food products in the hopper holders 45 slide between passes through the portioning means 80. The upper surface 85s and cutting edge 85 of the blade 86 will be in the same plane and when no portion is to be removed, the upper surface of platter 86 will also be coplanar therewith as shown in FIG. 5B. When portions 61a are to be removed, the platter 86 will be recessed below that surface 40s by the desired thickness 89 of the portions as shown in FIG. 5A.

The addition of food means to the holder may be effected in many ways including feeding by hand or by a mechanical means such as an overhead loading hopper, not shown, which has axially aligned holder means that simultaneously empty into the hopper. In any event, with a four hopper arrangement being employed in a carousel and speeds of 100 products per minute, the hopper will rotate at a rate of 25 rpm which is slow enough for systematic hand feeding. With the portioning being constant, all holder means 45 will empty at the same rate. The transparent or translucent holders make it easy for an operator to determine the status of each. It will be understood that the number of products that may be produced in a given time period is a function of the diameter of the carousel, the size of the hoppers, the number of hoppers on the carousel and of course the speed.

Referring to the embodiment illustrated in FIG. 10, it may be seen that the upper and lower support means 46a and 46b respectively for the holder means 45 may be relatively thick, generally planar members made of ultrahigh molecular weight (UHMW) food grade polymers as shown each having holes 46c therein which holes are of an entrance diameter at least as large as the outside diameter of the holder means 45 whereby the ends of the holder means 45 may be removably received therein. The holder means 45 may be of suitable material and we have found that clear PET or polycarbonate of food grade quality is satisfactory. The respective lower and upper holes 46c are made to have an enlarged portion equal to the outside diameter of the holders 45 and receiving an end of the holder 45 therein and a reduced portion of a diameter equal to the inner diameter of the holder tubes 45 whereby the holder tubes 45 will be held at top and bottom against movement. Suitable tie bars may be provided if desired to hold support means 46a, 46b and intermediate holder means 45 in fixed relationship.

Each of the lower and upper support means 46a, 46b respectively for each of the hopper means 41, 42, 43 and 44 is removably attached to a central drive hub support means 46d by means of lugs 46e, 46f that engage slots 46g and 46h respectively on each hopper assembly. With this construction, cleaning and changeovers from one product to another are easily facilitated since each hopper means may be easily lifted off the central support. In turn, the top and bottom support means 46a, 46b for each hopper may be popped off to separate the holder means 45 for cleaning or change. Also the drive hub assembly 46d may be removed as part of the disassembly, e.g. to allow ready removal of cover plate 40c. Although four hopper assemblies 41, 42, 43 and 44 are shown, it will be understood that this number may be more or less. We contemplate even numbered multiples such as 4, 6, 8 or more in each carousel depending on the size of the carousel and the hoppers.

The hopper means generally indicated at 41–44 are held in a predetermined relationship to each other in a carousel structure 50 which is moveable along a first path 55 in accordance with a controlled program so that the movement of the carousel 50 coincides with the arrival of a substrate pizza crust 30 below the cutting means 80 whereby as will be disclosed, the portions of the contents 60 of the carousel are portioned as by liquid dispensing or slicing to deposit the portions on the substrate pizza crust.

Whereas the holder means 45 are illustrated as being vertically disposed relative to the portioning means, it is within the contemplation of this invention that they may be disposed at a non-vertical angle. Such non-vertical angle may be especially attractive to create different cross-sectioned configurations, e.d., oval slices of sausage instead of round. It is also contemplated that means may be provided to assist movement of the materials through the holder means. These may be mechanical pushers or other means such as low pressure air suitably provided through a manifold means above the portioning means.

The portioning structure and sequence of solid type food products may be best understood from a review of FIGS. 5A, 5B, 6 and 7 wherein it will be seen that the thickness of the slice 61a depends on the distance 89 between the edge 85 of the blade 84 and the top surface of platter 86. This distance 89 may be easily and quickly adjusted during continuous operation as herein explained by raising or lowering the center support platter or platform 86 against which the food rests before it is removed.

It will be understood that as the holder means 45 rotates in the second path 55 the lower portion of the good product in the holder means will bear against and pass along a generally planar surface 40s, will pass over the upstream generally planar upper surface 85s of knife blade 84f which lies in substantially the same plane as the surface 40s, will pass over the upper generally planar surface of platter 86, will pass over the other upper surface 85s of blade 84 and back to surface 40s. If the surface 86s is lower than the cutting edge 85 which is co-planar with surface 85s of the cutting blade means 84, a portion equal in thickness to the difference 89 will be removed.

An easy and advantageous means we have found for varying the distance 89 includes providing an infinitely adjustable means for rotating the platter 86 about a center post 86r relative to fixed posts 86a. As the platter rotates, the upper portions of each of a plurality of posts 86a move along inclined cam surfaces in slots 86b on the underside of support platter 86. The number and spacing of the posts 86a and slots 86b is such that the platform moves upwardly uniformly and maintains a planar attitude parallel to the original attitude. By this means, the level of the upper surface 86s of the platter 86 is respectively raised and lowered by rotating the platter 86 relative to the support posts 86a.

Rotation of the platter is effected by a convenient mechanism which may be mounted as shown in FIGS. 3 and 8 outside and adjacent the carousel. In the illustrated embodiment this takes the form of a housing 86d having a telescopically related arm 86c with an outer end thereof connected to an outer end of a lever arm 86f. The lever arm 86f has a generally central pivot point 86g and an inner end with an upwardly extending pin 86h that engages a recess in the bottom of platter platform 86. An adjustment means 86j at the end of housing 86d causes the arm 86e to move into and out of the housing and thereby cause movement of the lever arm 86f which in turn moves 86h and rotates platform 86. Such rotation moves the relative position of the ends of the posts 86a with respect to the inclined cam surfaces in the slots 86b whereby the level of the platform changes. It is an important feature that this mechanism allows a quick and easy change in thickness during full speed continuous operation.

A further mechanism is included to provide no or zero portion removed from the hopper means as required, e.g., where the conveyor means 20 does not have a substrate in the flight 26b coming to the portioning point. When this is detected by suitable presence sensing detectors such as a photoelectric cell, a signal is sent to a means such as a solenoid actuated mechanism 86k that has a piston 86l pivotally attached to an inner end of a lever 86m which in turn is pivotally mounted at the center and has it outer end connected to the housing 86d. Actuation by the solenoid thus moves the whole adjustment means 86d through 86h in a direction to rotate the platform 86 so that it raises to a point where the distance 89 is effectively zero and no portion of material 61 will be removed. After this condition passes, the solenoid is deactivated and the adjustment means 86d through 86h return to their condition and setting prior to being activated. This is an important feature of the method and apparatus as, for example, it allows full speed continuous operation under any condition. Also it provides a means for allowing certain substrates 30 to be skipped as desired or required.

As shown in FIGS. 5A, 5B, 6, 7 and 8, a product propelling and directing guide means 100 is provided in what may be referred to as the product zone half of the periphery of the positioning means, i.e., the downstream half in which the cutting blade 84 would effect the portioning of the material 60 as it moves thereover. Located with an inner most edge of an upper surface 102a generally just below the knife edge 85, the product guide means 100 receives the portions 61a, 61b being removed from the supply means 60a, 60b respectively and not only effectively propels it toward the substrate 30 but acts to keep the portion moving in a predetermined direction which may be generally parallel to the path of movement of the substrate means 30 or at radial angles thereto. This provides advantageous results in speed of deposit and quality regardless of the consistency and shape of the food product being applied.

The effective propelling of the portions is achieved in one embodiment by causing the guide means 100 to vibrate in a reciprocating manner in a direction generally parallel to the paths of movement 25 and 55 of the substrate and hopper means respectively. The angles of the knife blade edge and the guide means surfaces 102a are preferably generally complementary. Movement of the portions 61a, 61b is also greatly enhanced by providing a plurality of parallel scallops 102b in the upper surface 102a. The scalloped upper surface 102a of the guide means 100 is in the area where the portion of product 61b will pass so that the straight edge line edge 102c in contact between the surface 102a and the product portion 61a, 61b will be reduced to a minimum along with the friction that would otherwise slow its movement or possibly change its direction if such friction were uneven across the width. Moreover, the straight line contact edges 102c between the scallops 102b serve to direct the movement of the product portions 61a, 61b in the direction of the line of contact 102c thereby assuring more consistent placement and quality. The vibratory shoe means 102 is mounted on several pins 103 at spaced points along its length. The pins pass through the shoe means 102 to allow the shoe means 102 to reciprocate thereon. Resilient means not shown may be provided as, for example, around the pins to accentuate the vibratory motion. In transverse cross section, the shoe means 102 has a compound slope which includes a first portion 102d that extends outwardly from the platter 86 and downwardly at a relatively gentle slope from the periphery of the support plate 86 and a second contiguous portion 102e lying outwardly of the first portion 102d and extending outwardly and downwardly therefrom to a point above the level of the substrates that are adapted to pass therebelow. In practice, the first portion 102d is inclined at an angle of about 30° below the horizon and the second portion 102e lies at an angle of about 60° below the horizon. The shoe 102 is preferably made of an ultra high molecular weight polymer of food grade quality.

Vibratory movement of the guide means 100 is achieved in one embodiment by a vibrator means generally indicated at 107 positioned in a recessed area 105 around the central portion of the unit 100. It includes a suitable source of vibratory movement such as a small solenoid 107a fixed in a recess 105 in the lower support portion 86p and a detachable transfer means 107b to transfer the vibratory motion to the guide shoe means 102. The transfer means 107b in our embodiment is a short piece of plastic tubing which has one end frictionally over an end of a cylindrically shaped driver portion 107c extending from the solenoid and the other end frictionally fit over a cylindrically shaped stud 102s projecting from the shoe means 102. This transfer means has been found very effective and extremely easy to remove and replace for cleaning of the guide means 100.

Another important aspect of the instant invention is an improved rotary cutting blade means 84 best seen in FIGS. 5A, 5B, 6, 7 and 8. By contrast with the blade structure disclosed in my prior U.S. Pat. No. 4,960,025; the blade means 84 of the instant invention, (a) has a blunter profile with a compound angled cutting edge to provide greater strength and improved wear; (b) has a thicker outer rim with an internal groove therein providing a more stable drive and a greater flywheel inertia effect; (c) has internal bushing rollers located on the interior of the periphery and adapted to engage the internal groove to add further stability at higher speeds; (d) has one bushing mounted on a quick release fitting that allows the bushing to be quickly and easily moved out of its operating position in the internal groove whereby the blade may be quickly removed and replaced; and, (e) has a gear toothed outer rim that mates with a cogged drive belt to provide positive drive and avoid slip under the heaviest cutting conditions.

The blunter profile best seen in FIG. 5A includes an inner first portion with a greater initial cutting angle alpha ($\alpha$) in the order of about 45° and a secondary portion with a cutting angle beta (B) of about 30° with the horizon. This has been found to provide greater blade strength that stays sharper longer.

The thicker outer rim 84a provides space for the internal groove 84b as well as increasing the inertia of the blade for smoother cutting and allowing a larger tooth and belt width for the cogged drive belt 84c to grip it. As may be understood from viewing FIG. 8, the drive belt 84c is endless and passes around drive cog 84d and idler wheel 84e as well as the periphery of the blade 84. Three internal bushings 84f, 84g, and 84h spaced generally at 120° along the circumference provide smooth, stable high speed, high load operation. The relationship of the backing to the groove may be seen in FIG. 5B showing bushing 84f in dotted lines. One of the three bushings, 84h, is mounted on a positioning means such as lever 84j which is pivotally and eccentrically mounted on the base plate 86p whereby the bushing 84h may be easily and quickly moved into an out of engagement with the groove 84b to allow it to be removed. A suitable locking means 84k is provided to fix the positioning lever 84j in place during operation.

FIGS. 6 and 7 show the substrate 30 carried by the conveyor 20 directly below the hopper 41 and the cutting means 80. At this point the ends of the food products 61 are resting on the platter 86 within the perimeter of the circular cutting ring 84. The ring 84 is driven to rotate about a central axis as set forth in my prior U.S. Pat. No. 4,960,025 incorporated herein by reference. The hopper means 41, 42, 43, 44 move in timed relationship with the receiver means 30 while the portioning means 80 remains stationary. Accordingly, individual pieces of material 61a and 61b in FIG. 7 will be sequentially cut by the knife edge 85 and dropped via propelling means 100 between the knife edge and the platter 86 onto the carrier means 30. As schematically shown in FIG. 7, the portion 61a of the material 60a has been separated and is lying on top of the substrate 30. A portion 61b is in process of being separated.

Figure 4:
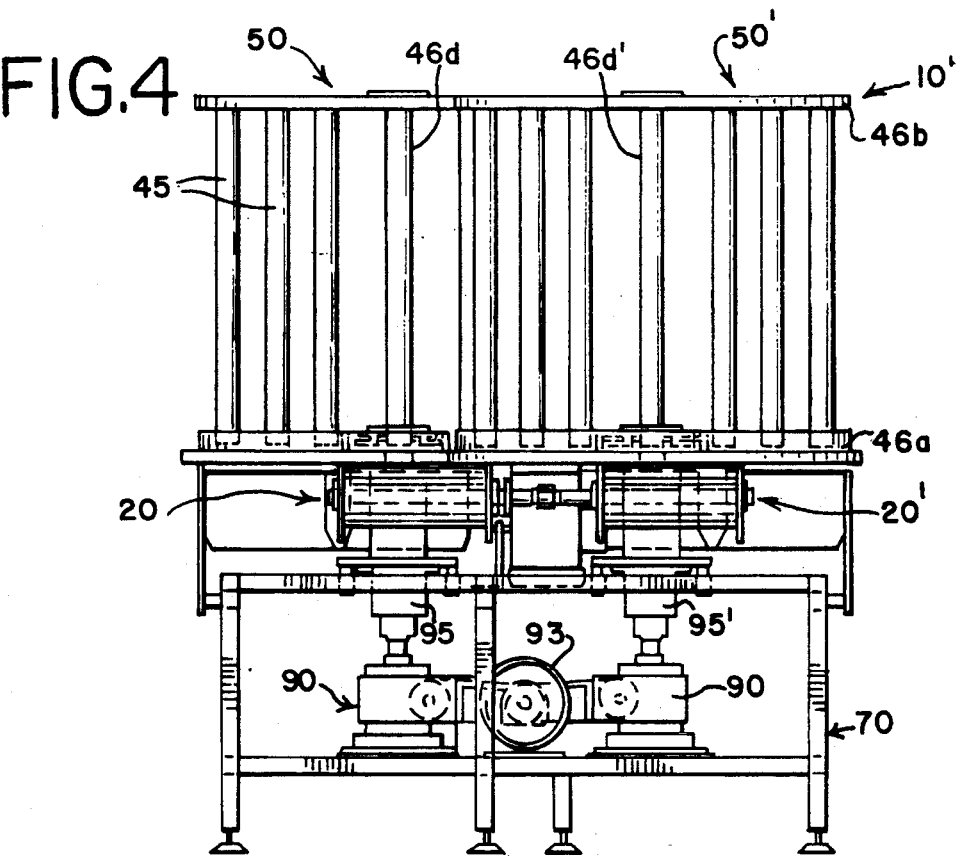
FIG. 4 is an elevational end view of the apparatus of FIGS. 1, 2 and 3.

As may be best understood from FIGS. 2–4, the drive means generally indicated at 90 for moving the conveyor means 20 and carousel 40 in timed relationship with each other comprises motor means schematically shown at 93. Preferably, the motor means 93 supplies power to both machines 10, 10' through power transmission means schematically represented by the shaft 94a, belt 94b, and gearing or direction changing means 95. In practice we have found that a motor 93 of two horsepower provides adequate energy for products such as sausage. The operation of the motor means, gearing and transmission means is separately controlled by a logic control means schematically represented at 96 including a programmable panel 96a appropriately wired to the motors and power supply as will be understood by those skilled in the art.

The drive means 94, 95 includes a differential drive control that allows changing the gear input to output relationship between the conveyor flight 25b and the hopper means 40 and/or carousel 50 so that any adjustments between the position of the hopper vis-a-vie the substrates 30 in flight 25b may be made through the control means 96 while the machines 10, 10' are operating at full speed.

A separate power means 90a is provided for the infeed means 26 as shown in FIGS. 1–3 where the motor 90a transmits power via a belt 94c to the pulley 21d. As previously described, operation is by a logic control means 90b.

Another function that may be separately powered is the rotation of the knife blade which, as shown, relies upon a motor means 92 that transmits power to a drive gear 84d that drives the cogged belt means 84c encircling the knife portioning means 84. In practice we have found a half horsepower motor adequate for the materials being processed.

Figure 9:
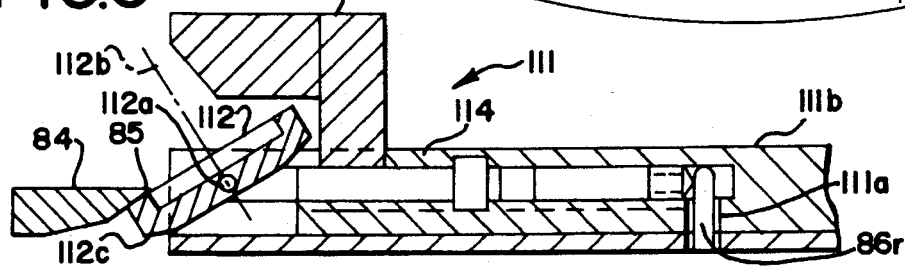
FIG. 9 is a schematic view of a unique sharpening and honing means for the blade.

Although the above described compound angle configuration of blade means 84 has been found to provide a significantly increased useful life, when it is necessary to sharpen the blade means during a routine maintenance, there is provided a novel means generally indicated at 111 as shown in FIG. 9 that greatly expedites this function. Thus, with the platter 86 removed as by lifting by means of the finger holes 86t, the knife sharpening means 111 is readily mounted by placing a downwardly facing recess 111a on one end of base 111b over the center post 86r which upstands from the base 86p and serves to anchor platter 86 for rotary motion. The base 111b has a carriage means 114 radially slidable thereon toward and away from the blade 84. A preferably circular sharpening stone means 112 is pivotally and rotatably mounted on the carriage means 114 for pivoting movement respectively about horizontal axis 112a and rotary motion about axis 112b perpendicular thereto. A handle means 115 connected with carriage 114 facilitates movement of the sharpening stone 112 into and out of engagement with the rotating blade edge 85 to effect sharpening. With light hand pressure, the stone is moved radially into contact with the rotating blade to effect sharpening in one, two or three revolutions of the blade. To hone the blade, the carriage is moved to allow the stone to be rotated about axis 112a so that surface 112c is above the blade edge 85 and the carriage replaced and the process repeated to remove the burrs in one or two revolutions. All controls are suitably set so that full safety precautions are in effect during the sharpening rotation of the blade.

While the sharpening means 111 has been disclosed as an add-on accessory, it is within the contemplation of this invention that where permitted by law it may be incorporated in the structure by providing a suitable recess in the support plate 86p and moved into and out of sharpening and honing position by control means and movement generating means such as a solenoid or pneumatic means.

Figure 12:
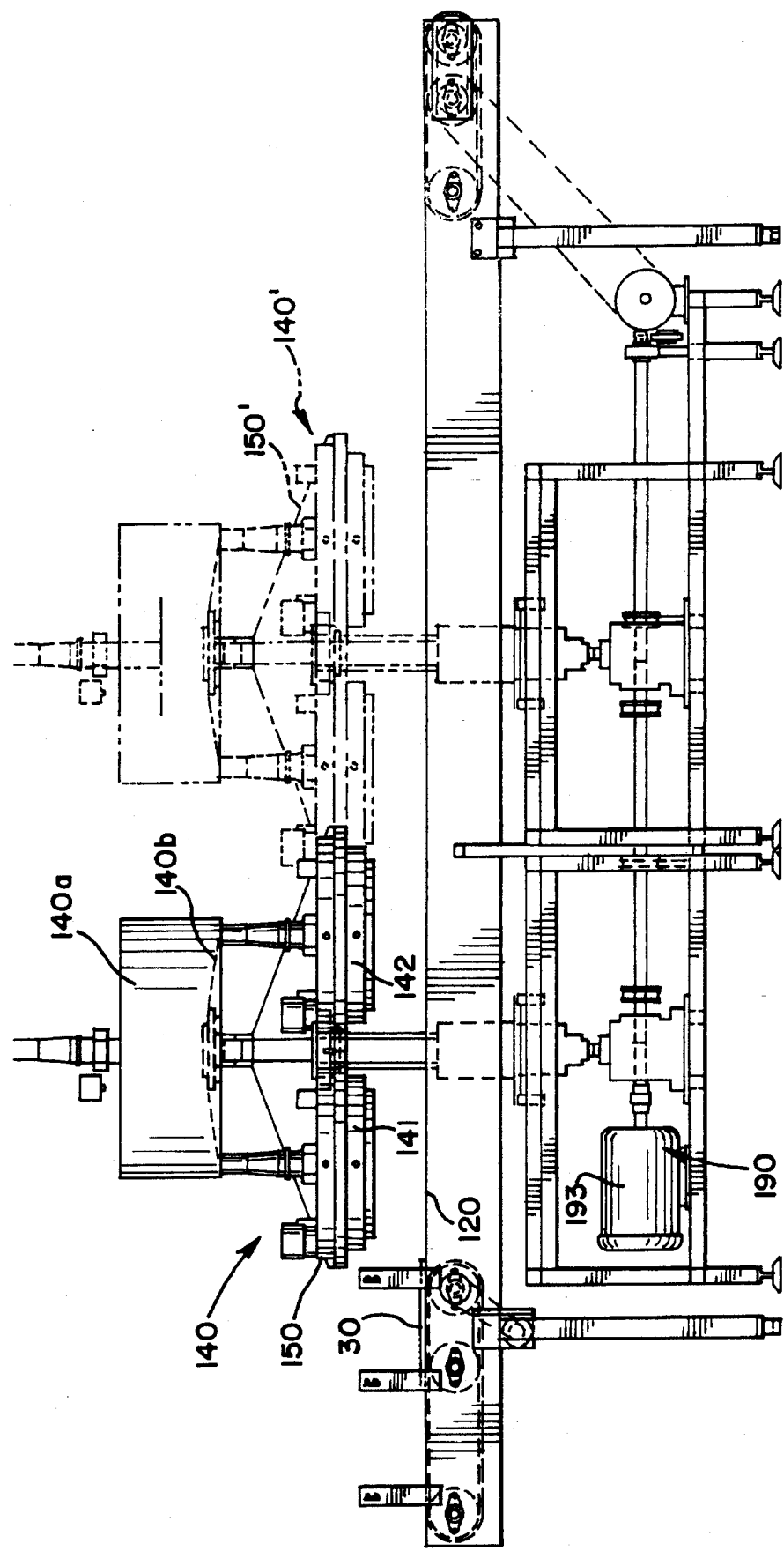
FIG. 12 is a side elevational view of a further embodiment of the invention to a means for applying a liquid sauce to a substrate; and, FIG. 13 is a top plan view of the embodiment of FIG. 12.

The basic concepts of the invention of a continuously moving conveying means for carrying substrates in a first path synchronized with the continuous movement of a hopper means in a second path that overlies said first path along a portion thereof may be applied to the application of a liquid means such as a sauce to a substrate such as a pizza crust. Thus, there is shown in FIGS. 12 and 13 a similar arrangement of apparatus 110 comprising continuously moving conveyor means 120 carrying substrates 30 along a first path 125p underneath a plurality of hoppers 140 arranged in a carousel 150 moving in a second path 155 whereby the path 125p and 155 coincide in a dispensing zone 180 whereat the sauce is dispensed onto the top of the substrate 30 as the hopper 140 and substrate 30 move at the same speed along their respective paths. Similar drive and control means 190 mounted on similar support means 170 provide synchronized high speed control for smooth operation that produces consistent quality products. The means for dispensing the sauce may be as described in either of my prior U.S. Pat. Nos. 4,771,726 or 5,171,367 which are incorporated herein by reference.

In the dispensing of the sauce means 160, a master hopper means 140a serves as a reservoir of sauce 160 for each of the sauce dispensing heads 141, 142, 143 and 144 and is suitably connected to each of the dispensing heads as for example by a conduit means schematically shown at 140b. In this arrangement, the sauce 160 may be kept properly mixed with solids and liquids in the master tank 140 and fed out to the sauce dispensing heads while they are in the no-dispensing position whereby when they reach the dispensing zone they will be fully charged with the correct amount of sauce. In practice, it has been found that dispensing the sauce in a dispensing zone that covers about 30° of rotation produces excellent quality at high speed.

From the foregoing, it may be seen that the invention provides improved apparati and methods for the automatic, continuous, high speed sequential portioning of food in a liquid or solid form and deposit on a substrate 30.

In the operation of a liquid food application, the receiver 30 such as a pizza shell accurately spaced in a flight on conveyor means 120, moves in a substantially continuous first path 125p, typically, but not necessarily, in a horizontal plane, and the hopper means full of material 160, to be portioned by means 141–144 moves in a second, generally planar path 155. The first and second paths 125, 155 generally overlap in the area of the portioning means 180 so that the liquid food which may be a sauce is deposited on the carrier 30 in a predetermined pattern or arrangement.

In operation or operations involving solid food products, the receiving substrate means 30 are deposited in spaced, predetermined relationship to each other and to the carrier or conveying means 20 as previously explained so that the receiving means 30 move along a first predetermined path 25p and pass underneath a hopper means 40 containing an arrangement of a plurality of pieces of material 61 to be portioned. A plurality of the hopper means 40 is set to be moving in spaced relationship to each other in a circular second path 55 at a speed synchronized to the speed of the carrier means 20 along path 25p such that their paths 25p and 55 intersect and are vertically coextensive at least in the area of the portioning or cutting means 80. As may be seen, we have found that having path 25p follow below path 55 for nearly 180° produces excellent results. At this point, the portioning means 80, which may comprise knife means 84, 85, are brought into operative engagement with the material 60 and portioning is effected as for example, to produce slices 61a, 61b. With the movement of receiving substrate means 30 synchronized with hopper means 40, the slices 61a, 61b drop via propelling means 100 as the two are moving onto the receiving substrate means 30 in a predetermined pattern. Although with sausage and similar solid food products we envision a pattern of product being deposited which is similar to the pattern of the arrangement of the pieces 61 in the hopper means 40, they may be deposited in a different pattern.

In the making of sandwiches or subs, for example, it is possible that batches of a plurality of slices of bread or roll substrates may pass seriatim under a series of hoppers containing respectively, for example, ham, cheese, lettuce and tomato whereby a plurality of sandwiches or subs may be quickly and accurately assembled. In such case it will be understood that each hopper may comprise holder means generally equal in size and configuration to the bread substrate. Vertical adjustment of the height of the hopper carousel 50 allows substrates of a wide range of thicknesses to be used.

Also, while the receiver substrate means and hoppers have been shown as being round and of the same outer configuration in plan view, they need not be so but in fact may be square, rectangular or of any other geometric shape and the patterns of one need not be the same as the pattern of the other. Moreover, the outer configuration of the hoppers 41–44 are not critical because the holders 45 therein may be filled in any pattern. Similarly it is contemplated that where the substrate means is a slice or part of a slice of bread or roll halves, a plurality of such substrates may be moved through in batches on a batch support means.

At any time during their movement, the hopper means 40–44 may be easily loaded with materials as they rotate.

This may be effected by simply loading the holders 45 by hand or by providing a more automatic means such as a gated material supply magazine (not shown) above and coaxially aligned with the holders releasable to load the holders in one quick operation.

While the holders 45 are shown as relatively small, cylindrically shaped tubes adapted to receive food products of relatively uniform cross section such as sticks of sausage, it is also contemplated that the holders may be of other configurations to provide a special design, e.g. stars, pumpkins, pigs, rabbits, elephants, donkeys appropriate for special occasions and for the proper portioning of other food products such as for example mushrooms, celery, ham, lettuce, tomatoes and onions. Moreover, the shape of all of the food product holders in a hopper need not be the same and in turn each hopper in the carousel need not have the same size, shape or arrangement of holders whereby two adjacent hopper means may be each filled with different food products.

It is an important feature of the invention that the operation of the apparatus is smooth, reliable, accurate and efficient. Efficient maintenance is achieved by the ease of assembly and disassembly made possible by the modular design features.

While the invention has been described with reference to preferred embodiments, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

We claim:

1. An apparatus for the high speed, automatic creation of portions of material and the deposition of those portions on a substrate comprising:

means for conveying said substrate in continuous motion in a first path in a progression;

a hopper to hold said material, the hopper being continuously moveable in a second path, which path spatially coincides over a segment of said first path;

portioning means for removing portions of said material held in said hopper; and control means coupled to said conveying means and said hopper for synchronizing the relative position and speed of said substrate on said first path and said hopper on said second path whereby said removed portions of material are deposited on said substrate.

2. An apparatus according to claim 1 comprising a plurality of said hoppers detachably mounted in a carousel.

3. An apparatus according to claim 2 wherein each of said plurality of hoppers are detachably mounted on a support means for moving said hoppers in said second path.

4. An apparatus according to claim 3 wherein said hoppers comprise an upper and lower support each detachably mounted on said support means and detachably securing upper and lower ends respectively of a plurality of holder means to contain said food products, said supports and said holders having aligned top and bottom openings whereby they comprise conduit means allowing materials deposited in the top openings to pass through and out the bottom openings.

5. An apparatus according to claim 4 further including a pattern determining means to block the top openings of a predetermined number of holders to prevent entry of materials therein to allow varying the pattern of portions removed from such hopper means.

6. An apparatus according to claim 2 wherein said hoppers are spaced from each other and said conveying means includes flights of predetermined spacing to convey a substrate therein, said spacing of said flights on said first path being equal to the spacing of said hoppers on said second path.

7. An apparatus according to claim 6 further including an infeed means capable of automatically moving widely randomly spaced incoming substrates at various speeds into flights of predetermined spacing for maximum throughput.

8. An apparatus according to claim 7 wherein said infeed means comprises an infeed belt means to contact a substrate and move it; a logic control means detecting the presence and position of a substrate and adjusting its speed on said infeed belt to fit it into the nearest open flight; and, a power means coupled to said infeed belt means responsive to the logic control means to provide the necessary speed to the infeed belt means to move the substrates within a flight.

9. An apparatus according to claim 8 further including snubber means positioned downstream from said infeed means to frictionally engage the substrate and hold it until it is positively contacted by a flight defining upstanding protrusion on said conveyor means whereby each substrate is spaced exactly within each flight.

10. An apparatus according to claims 1 or 9 wherein said control means causes a speed of movement of each flight on said conveyor means and a speed of movement of said hopper to be the same in their respective first and second paths at least in the area of said portioning means.

11. An apparatus according to claim 1 wherein said second path of movement of said hopper is a circular path and said first path of movement of said conveyor means has a circular portion in the area it is below said hopper.

12. An apparatus according to claim 1 wherein said material in said hopper is a generally solid food material and said apparatus further includes a portion adjusting means for adjusting the size of said predetermined portions removed during continuous operation of said apparatus.

13. An apparatus according to claim 12 wherein said portion adjusting means comprises means for quickly, easily and accurately changing the relative distance between a cutting edge means and a reference platform on which said material moves before being separated during continuous uninterrupted operation whereby the thickness of the portion removed from said hopper may be changed.

14. An apparatus according to claim 1 wherein said material in said hopper is a generally solid material and said apparatus further includes a propelling means positioned adjacent to said portioning means adapted to propel and direct separated portions of said material quickly and accurately toward said substrate.

15. An apparatus according to claim 14 wherein said propelling means includes a vibratory motion means for vibrating said propelling means in a direction generally parallel to said first and second paths.

16. An apparatus according to claim 14 wherein said propelling means includes downwardly directed portion contacting surfaces that are scalloped to have straight line raised edges aligned generally in the direction of said first and second paths whereby portions will more easily slide downwardly and be directed by said raised edges toward said substrate.

17. An apparatus according to claim 2 including two complete apparati in side-by-side generally parallel relationship, with the carousel means of each having a width wider than a width of each conveying means, said carousel means being staggered in position along the length of said respective first paths so that a portion of each carousel overlies a portion of the first path of a corresponding conveying means.

18. An apparatus according to claims 1 or 2 wherein said conveying means and said hopper of said apparatus are driven by a common drive means.

19. An apparatus according to claim 1 wherein said first path has curved portion and wherein said apparatus further includes a pair of quickly detachable side guide means on opposite sides of the path of the substrate at least in the area of said curved portion and said portioning means, said side guide means being readily changeable to accommodate different sized substrates and being of a size and configuration to accurately guide said substrates along said first path.

20. An apparatus according to claim 1 including a vertical adjustment lift means for quickly and easily raising said hopper and said portioning means an infinitely variable amount to allow adjustment of the distance between said conveying means and said portioning means whereby substrates of various thickness may be accommodated and/or access to other portions of said apparatus may be made.

21. An apparatus according to claim 1 wherein said material in said hopper is generally solid and said portioning means includes a cutting blade having a multifaceted cutting edge, the blade having a first portion and a second portion, the first portion having a greater cutting angle than the second portion.

22. An apparatus according to claim 1 wherein said material in said hopper is generally solid and wherein said portioning means includes a circular rotary cutting blade means said cutting blade means having an outer toothed perimeter portion adapted to engage a cogged driving belt means, and an inner groove means receiving a plurality of bushing means therein, said bushing means holding said blade means in position and providing smooth, stable high speed cutting action, said bushing means being arranged around said circular blade so that removal of one bushing means allows removal of said blade means, said one bushing means being mounted on a lever means for movement into and out of engagement with internal groove on said cutting blade means to provide for quick release of said cutting blade.

23. An apparatus according to claim 1 wherein said material in said hopper is generally solid and wherein said portioning means includes a circular rotating cutting blade means, said cutting blade means having a cutting edge on its internal diameter, said apparatus further including a sharpening means adapted to be fixed radially internally of said blade diameter and relative to said blade edge and movable radially into and out of engagement with said cutting edge to effect sharpening and honing.

24. An apparatus according to claim 1 wherein said conveying means includes an endless loop flex belt means having a first loop end engaging a mating portion on a drive pulley means to provide a positive drive means therefor, and a second loop end engaging another pulley; said belt means moving in a first path including a curved portion, said belt means being guided in said curved portion by belt guide means to maintain an accurate path through said curved portion.

25. An apparatus according to claim 1 or 24 wherein said conveying means in said first path is generally horizontally disposed and includes upstanding protrusions spaced at predetermined intervals therealong, said protrusions positively engaging said substrates and to move said substrates along said first path.

26. An apparatus according to claim 1 wherein said material in said hopper is generally solid and wherein said hopper includes a plurality of upright holder means to which food product may be added in an upper end portion and from which food product may be dispensed from a lower end portion, said holder means having configurations in plan view to accommodate a desired food product configuration and desired configuration of the portion to be dispensed.

27. An apparatus according to claim 1 where said conveying means, said hopper and said portioning means are constructed to be readily assembled and disassembled for cleaning and maintenance, said hopper comprising a top and bottom support respectively detachably gripping a plurality of holder means at their top and bottom, said top and bottom support being detachably connected to a central support means whereby each of a plurality of hoppers may be lifted onto and off of said central support means and said top and bottom supports may be moved in opposite directions to release said holder means; said portioning means including quick release means moveable from a position holding a blade means securely in cutting position and a position allowing removal of said blade means; said conveying means including side guide means having pins on a lower side engaging holes on said apparatus whereby said side guide means may be easily lifted out of position.

28. An apparatus according to claim 1 wherein said material is a generally liquid food material and said portioning means are sauce spreading heads.

29. An apparatus for the high speed, automatic creation of portions of material and deposition of said portions on a plurality of sequential substrates comprising:

means for conveying said substrates in continuous motion in a first path;

a hopper that holds food material and continuously rotates about an axis in a second path, a segment of said second path coinciding with a segment of said first path;

means coupled to said means for conveying and said hopper for controlling movement of said means for conveying and said hopper with respect to each other; and means positioned adjacent the hopper for portioning the food material onto the substrates at a position where said segments of said first and second paths coincide.

30. An apparatus according to claim 29 further comprising a plurality of said hoppers mounted in a carousel.

31. An apparatus according to claim 30, wherein the individual hoppers are spaced a distance from each other on the second path and the substrates are spaced the distance from each other on the first path.

32. An apparatus according to claim 31 wherein the means for controlling movement controls the conveyor and hopper at equal rates of speed.

33. An apparatus according to claim 29 wherein the portion of the second path that coincides with the first path is a curved portion of the first path.

34. An apparatus according to claim 29 wherein the portioning means is a cutting blade that portions solid food material onto the substrates.

35. An apparatus according to claim 29 wherein the portioning means is a dispenser that portions liquid food material onto the substrates.

36. An apparatus for the high speed, automatic dispensing of portions of food material onto substrates comprising:

means for conveying said substrates continuously in a first path;

a hopper that holds said food material and continuously rotates about an axis in a second path, a segment of said second path coinciding with a segment of said first path;

means positioned adjacent said hopper for sequentially dispensing portions of said food material onto said substrates;

means coupled to said conveying means and said hopper for synchronizing movement of said conveying means with movement of said hopper so said substrates are adjacent the means for sequentially dispensing when portions of the food material are dispensed.

* * * * *